(12) United States Patent
Oh et al.

(10) Patent No.: US 6,239,526 B1
(45) Date of Patent: May 29, 2001

(54) FLUX BARRIER SYNCHRONOUS RELUCTANCE MOTOR

(75) Inventors: Jae Yoon Oh; Dal Ho Jung, both of Seoul (KR)

(73) Assignee: LG Electronics, Inc. (KR)

( * ) Notice: Subject to any disclaimer, the term of this patent is extended or adjusted under 35 U.S.C. 154(b) by 0 days.

(21) Appl. No.: 09/532,151

(22) Filed: Mar. 21, 2000

(30) Foreign Application Priority Data

Sep. 22, 1999 (KR) .................................. 99/41153

(51) Int. Cl.[7] .............................. H02K 19/02; H02K 1/22
(52) U.S. Cl. .......................... 310/162; 310/261; 310/168
(58) Field of Search ..................................... 310/261, 168, 310/162, 163, 166

(56) References Cited

U.S. PATENT DOCUMENTS 5,818,140 * 10/1998 Vagati ................................... 310/185
5,903,080 * 5/1999 Nashiki et al. ....................... 310/168

* cited by examiner

*Primary Examiner*—Burton Mullins
(74) *Attorney, Agent, or Firm*—Ostrolenk, Faber, Gerb & Soffen, LLP

(57) ABSTRACT

A flux barrier type synchronous reluctance motor in which a plurality of flux barriers are provided in a rotor, of which a plurality of ribs form the end portion of each of the flux barriers, wherein assuming that both ends of a single flux barrier are a first and a second rib, when the first rib faces the center of a slot of a stator, the second rib faces the center of a teeth of the stator.

2 Claims, 7 Drawing Sheets

FLUX BARRIER SYNCHRONOUS RELUCTANCE MOTOR

BACKGROUND OF THE INVENTION

1. Field of the Invention

The present invention relates to a synchronous reluctance motor having a plurality of flux barriers, and more particularly, to a barrier type synchronous reluctance motor with an improved flux barrier that is capable of reducing torque ripple.

2. Description of the Background Art

Generally, two axes are used for controlling a motor: one is a D axis, that is, a boundary of a magnetic pole, and the other is a Q axis, that is, a center of the magnetic pole. The D axis has a high magnetic permeability, and the Q axis has a low magnetic permeability. A torque is generated due to an inductance difference between the D axis and the Q axis.

FIG. 1 is a plan view of a synchronous reluctance motor having flux barriers in accordance with the conventional art.

For the convenience of explanation, an example is taken where there are four poles and 24 stator slots.

As shown in FIG. 1, a stator 10 includes a body 11, a plurality of slots 13 and teeth 14 formed at the inner circumferential surface 12. A rotor 20 includes a body 21, a plurality of flux barriers 22 and a plurality of ribs.

As to the ribs, there are provided real ribs 23 (demonstrated by a circle), that is, the end portion of the flux barrier and virtual ribs 24 (demonstrated by 'x')., and the interval therebetween (including the actual rib 23 and the virtual rib 24) is the same as the pole pitch of the rotator slot.

The body 21 of the rotor 20 is made of magnetic substance, and the plurality of flux barriers 22 is made of a non-magnetic substance, which are radially arranged having the Q axis as a center and D axis as a boundary.

The operation of the synchronous reluctance motor having the flux barriers in accordance with the conventional art will now be described.

First, an inductance is generated by a current applied to the winding coil of the stator 10, and a torque is generated due to the inductance difference between the D axis and the Q axis owing to the flux barrier 22, and the rotor is rotated by the torque.

Torque ripple is generated due to the relative position of the flux barrier and the slot opening 13a of the stator 10. In other words, the torque ripple is generated due to a variation of the relative position of the slot opening 13a of the stator 20 and the rotor rib 23.

FIGS. 2 and 3 are plan views of the synchronous reluctance motor in the case where the rotor 20 is placed at specific positions when the motor of FIG. 1 is operated. FIG. 2 shows the case where the ribs 23 and 24 of the rotor 20 face the slot opening 13a of the stator 10, and FIG. 3 shows the opposite case to that of FIG. 2, that is, the case where the rib 23 of the rotor 20 faces the teeth 14 of the stator 10.

The magnetic resistances which develops in each of the first and the second cases are much different to each other, and due to the magnetic resistance, variations a substantial torque ripple is generated when the rotor 20 is rotated.

For that reason, the torque ripple is substantial when the number of the rotor ribs (the actual rib 23 and the virtual rib 24) is the same as that of the stator slots and when the interval between the ribs is the same as that of the slots.

Since the torque ripple is determined by the arrangement structure of the flux barrier, to reduce the torque ripple, various techniques for designing the structure of the flux barrier have been developed and disclosed, which will now be described.

FIG. 4 shows a flux barrier type synchronous reluctance motor having a plurality of flux barriers in accordance with a conventional art, in which the number of the real ribs of the flux barrier 22 is greater than that of the slots 13.

In this case, even though some of the ribs face the slots 13, since the remaining other ribs face the teeth 14, the average value of the overall magnetic resistance is lowered although the magnetic resistance at specific portions remains quite large.

However, as to this kind of rotor having the plurality of flux barriers, since the structure of the rotor is complicated, its mechanical strength is weakened as compared to a rotor having a few flux barriers, and its fabrication is also difficult. This problem becomes more serious as the size of the rotor is reduced.

FIG. 5 is a plan view of a flux barrier type synchronous reluctance motor where D and Q axes are mechanically unbalanced in accordance with the conventional art.

Unlike the D axis of a general motor, the D axis is slanted toward one side as much as a predetermined angle θ, so that the D and Q axes are mechanically unbalanced.

With this structure, since the spacial intervals of the ribs of the flux barriers 22 and the intervals of the slots 13 are not the same, the torque ripple is reduced. However, since the D axis and the Q axis are unbalanced, it is difficult to judge electric D axis and Q axis when the motor is controlled, and the inductance values Ld and Lq according to the D and Q axes are influenced, causing a reduction of the overall torque output.

SUMMARY OF THE INVENTION

Therefore, an object of the present invention is to provide a flux barrier type synchronous reluctance motor by which the average value of the magnetic resistance generated according to the rotation of a rotor is constant regardless of the position of the rotor.

Another object of the present invention is to provide a flux barrier type synchronous reluctance motor of which the intervals between each rib, that is, the end portion of the flux barrier, are not uniform as a whole.

Still another object of the present invention is to provide a flux barrier type synchronous reluctance motor in which the rotor has a simple structure.

To achieve these and other advantages and in accordance with the purpose of the present invention, as embodied and broadly described herein, there is provided a flux barrier type synchronous reluctance motor in which a plurality of flux barriers are provided in a rotor, of which a plurality of ribs form the end portion of each of the flux barriers, wherein assuming that both ends of a single flux barrier are a first and a second ribs, when the first rib faces the center of a slot of a stator, the second rib faces the center of a teeth of the stator.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

As mentioned above, the interval between the ribs (including all of the actual rib 23 and the virtual rib 24) is the same as the pole pitch of the stator slot in the conventional art.

But, in the present invention, the intervals between the ribs is not the same as the pitch of the stator slot, and the intervals of ribs are not uniform.

That is, assuming that the both ends of the flux barrier are a first rib and a second rib, when the first rib is facing the stator slot, the second rib is facing the teeth of the stator.

Figure 1:
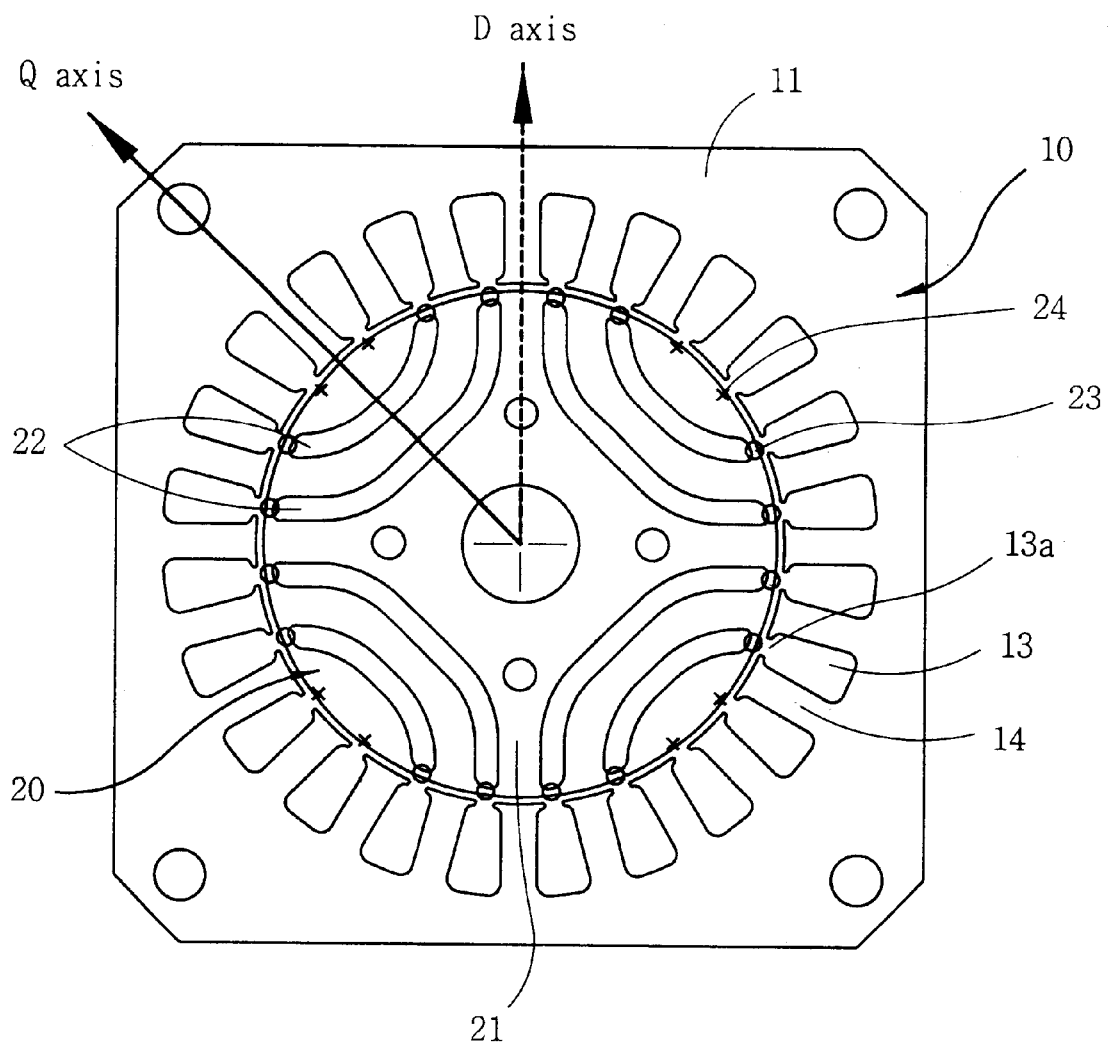
FIG. 1 is a plan view of a synchronous reluctance motor having flux barriers in accordance with the conventional art.
Figure 2:
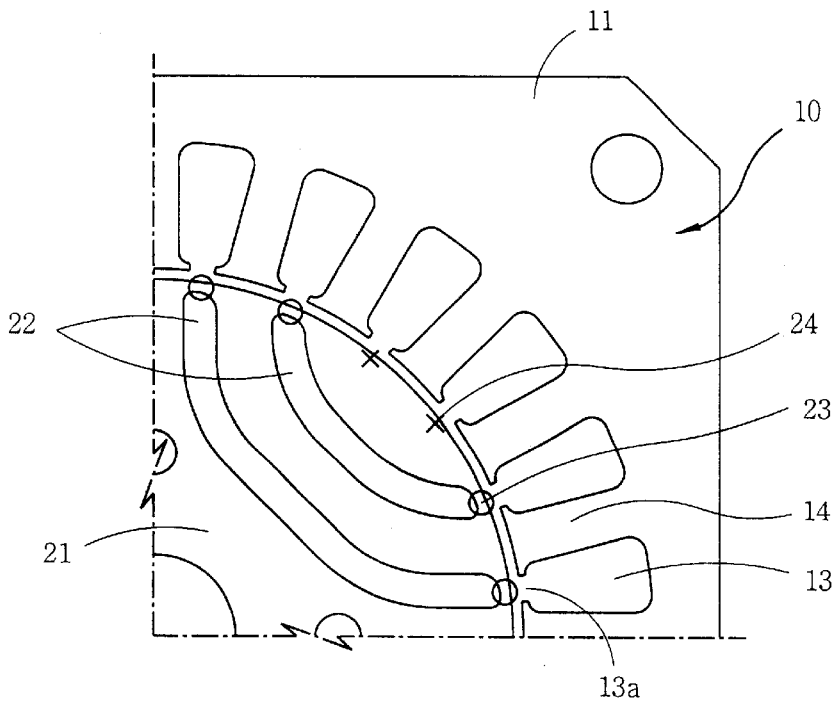
FIGS. 2 and 3 are plan views in case that a rotor is placed at a specific position when a motor of FIG. 1 is rotated in accordance with the conventional art.
Figure 3:
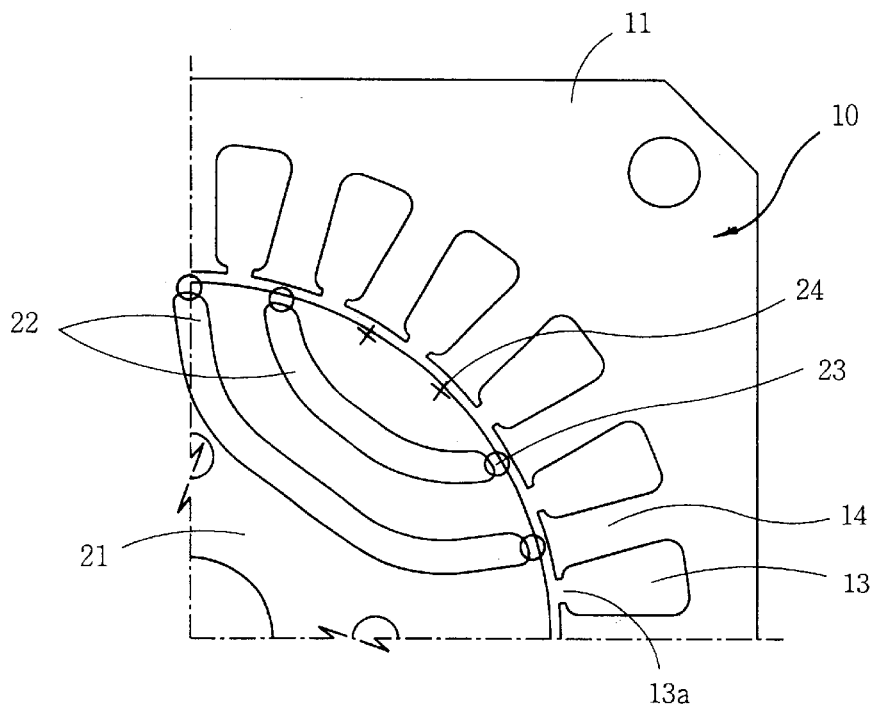
Figure 4:
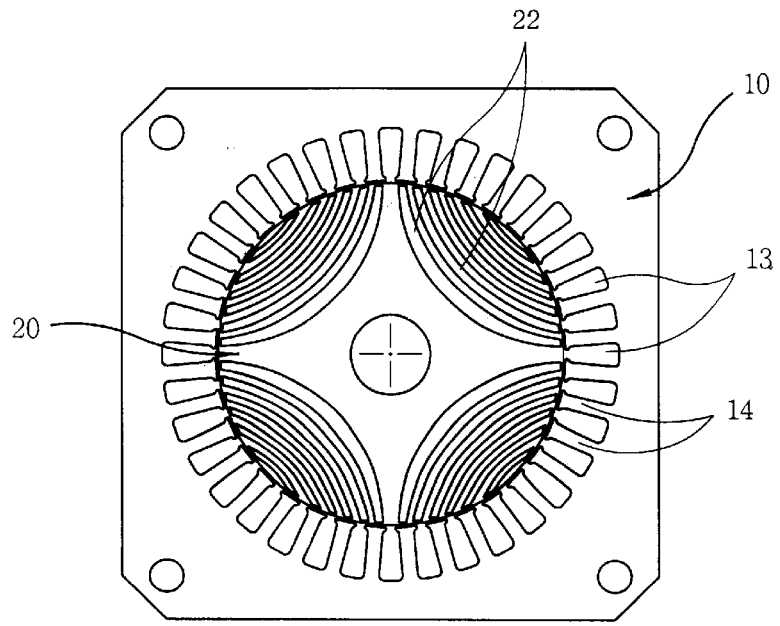
FIG. 4 is a plan view of a flux barrier type synchronous reluctance motor having a plurality of flux barriers in accordance with the conventional art.
Figure 5:
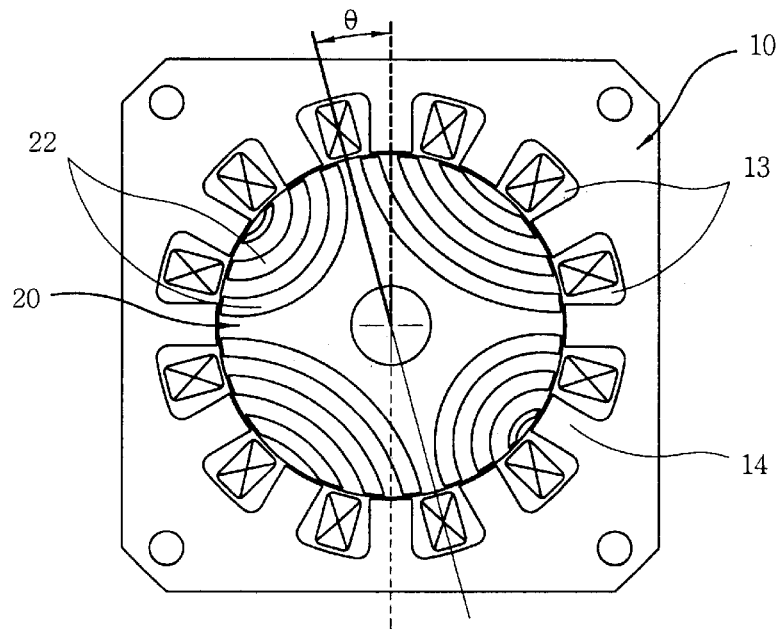
FIG. 5 is a plan view of a flux barrier type synchronous reluctance motor having a structure that D and Q axes are mechanically unbalanced in accordance with the conventional art.
Figure 6:
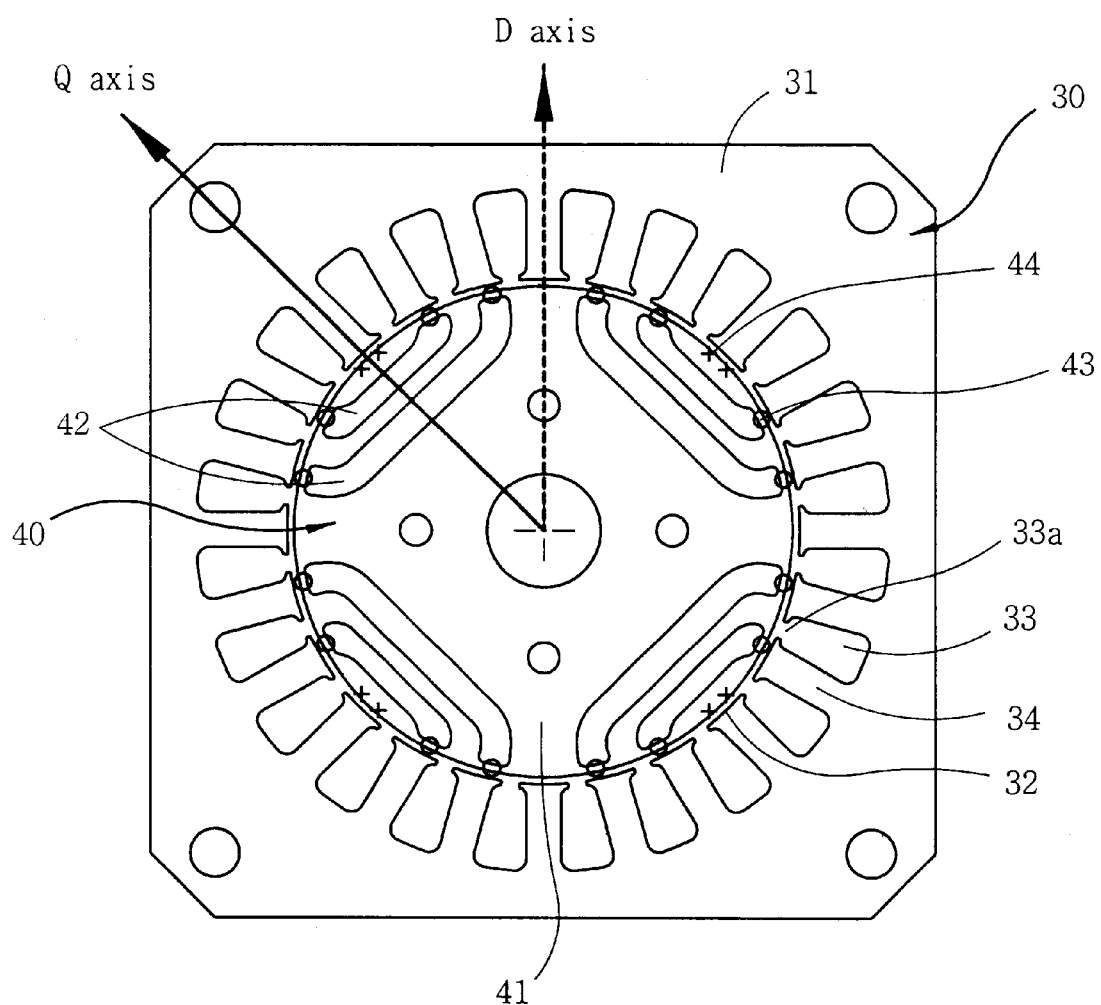
FIG. 6 is a plan view of a synchronous reluctance motor having flux barriers in accordance with the present invention.

FIG. 6 is a plan view of a synchronous reluctance motor having flux barriers in accordance with the present invention.

For the convenience of the explanation, an example is given in which there are four poles and 24 stator slots.

As shown in FIG. 6, the stator 30 includes a plurality of slots 33 and teeth 34 formed in a body 31 and its inner circumferential surface 32.

The rotor 40 includes a body 41, a plurality of flux barriers 42 each having predetermined width and length and a plurality of ribs 43 and 44. The ribs includes the actual rib 43 (indicated by a circle) making the end of the flux barrier and a virtual rib 44 (indicated by 'x').

The number of the flux barriers 42 per pole of the rotor 40 can be designed by the following two methods.

One method is that the number Nb of the flux barriers per pole of the rotor is designed by the following equation as expressed below:

$$Nb = \frac{Ns}{2P} - 1 \quad (1)$$

Where P indicates the number of poles of the rotor, and Ns indicates the number of the slots of the stator.

In case that the equation (1) is applied to the embodiment as shown in FIG. 6, Ns is 24 and P is 4, so that Nb becomes 2.

That is, the number of the flux barriers 42 per pole of the rotor 40 centering around the Q axis, that is, the center of the magnetic pole, is 2.

In this respect, in case the slots per pole is 6, the flux barriers are 2 in number, so that actual ribs 43, that is, the both ends of the flux barriers are 4 in number.

According to the other method, the number Nb of the flux barriers per pole of the rotor is expressed in the following equation:

$$Nb = \frac{Ns}{2P} \quad (2)$$

The number Nb of the flux barriers computed by the equation (2) is 3, one more than the number Nb of the flux barriers computed by the equation (1), which is not shown in the drawing.

In this case, when the slots per pole are 6 in number, the flux barriers are 3 in number, so that the actual ribs 43 making the both ends of the flux barriers is 6 in number.

The flux barriers may be selectively used in case according to the above two methods.

Meanwhile, an important thing is the relative position with respect to the ribs 43 and 44 of the flux barriers and the stator slots (or teeth).

The ribs of the flux barriers shown in FIG. 6 are slanted somewhat inwardly to the position facing the slot of the stator on the Q axis that is the central axis of the magnetic pole.

In other words, compared to that of the conventional art, the ribs 43 and 44 of the flux barriers are somewhat slanted to the Q axis that is the central axis of the magnetic pole.

Such position of the flux barriers will now be described in detail with reference to FIG. 7.

Figure 7:
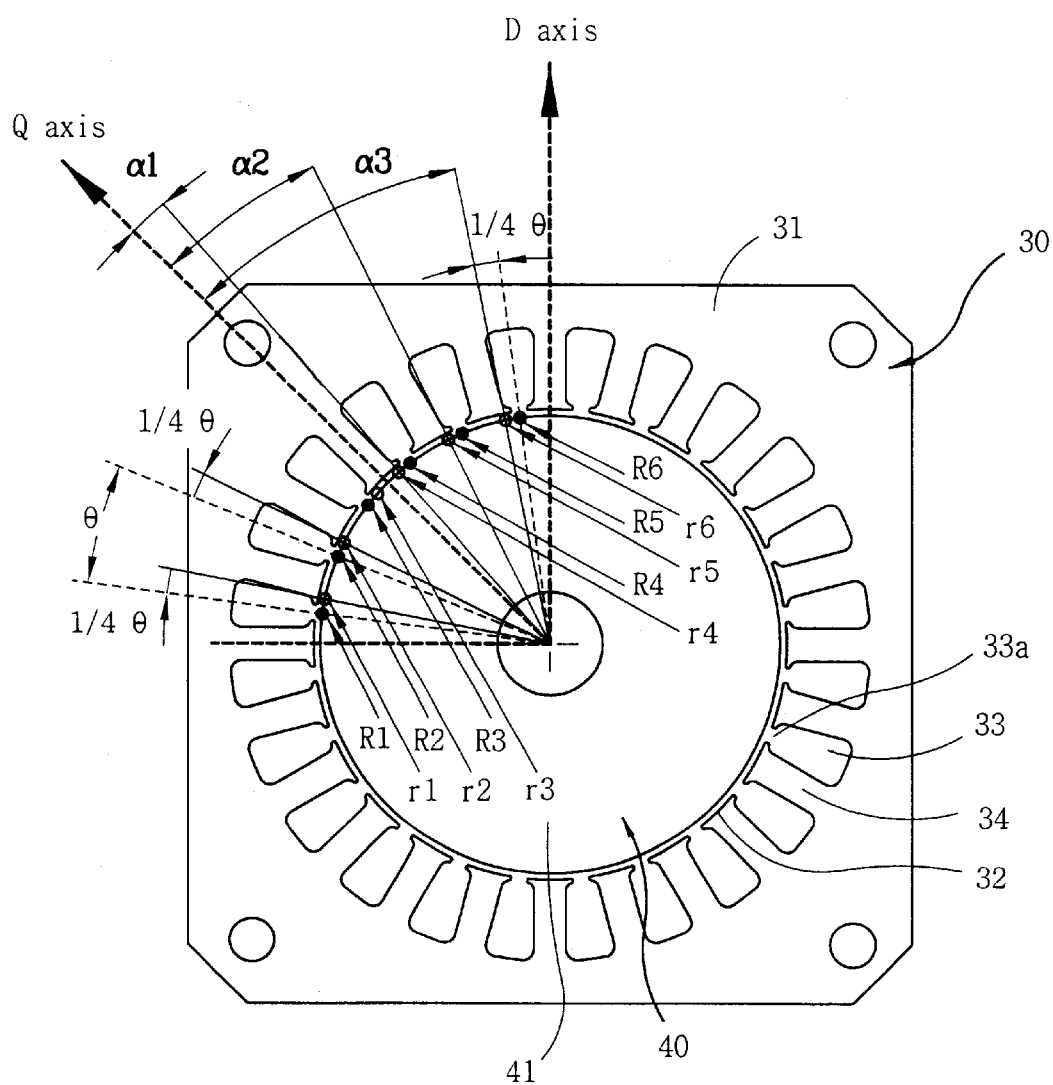
FIG. 7 illustrates arrangements of the flux barriers of FIG. 6 in accordance with the present invention.

FIG. 7 illustrates arrangement of the flux barrier of FIG. 6, of which reference numerals R1~R6 are positions of the rotor corresponding to the central positions of the stator slots 33, which are also the same positions of the ribs (including the actual rib and the virtual rib) of the flux barriers in accordance with the conventional art.

Reference numerals r1~r6 are the positions of the ribs of the flux barriers in accordance with the present invention, which are notably somewhat slanted toward Q axis compared to the positions R1~R6.

In this respect, the positions r3 and r4 correspond to the positions corresponding to the virtual ribs according to the equation (1), and corresponds to the positions corresponding to the actual ribs according to the equation (2).

The distance θ corresponds to one pitch (pole pitch) of the stator slot. The changed positions r1~r6 are shifted toward Q axis as long as θ/4 of the pole pitch from the previous positions R1~R6.

The first and the sixth positions r1 and r6, the second and the fifth positions r2 and r5, the third and the fourth positions r3 and r4 makes the both ends of the flux barriers by pairs, and since the third and the fourth positions r3 and r4 are virtual ribs according to the equation (1), there do not exist flux barriers corresponding to them.

The description that the both ribs is shifted toward the center as long as ¼(θ/4) of the pole pitch can be also expressed in that one rib is shifted as long as half (θ/2) of the pole pitch.

Assuming that the angle between the Q axis and the position of the rib is αm, the space angle $\alpha_m$ can be expressed by the following equation (3):

$$\alpha_m = (2m-1)\theta - \frac{\theta}{2}, m \le \frac{Ns}{2P} \tag{3}$$

Where, θ indicates a pole pitch, m indicates the order of the ribs distanced from the Q axis, as integers, for which m value for the positions r3 and r4 is 1, m value for the positions of R2 and r5 is 2, and m value for the positions r1 and r6 is 3.

When the equation (3) is applied to the case of 4 poles and 24 slots, the space angle α1 between the nearest rib from the Q axis and the Q axis is 7.5°, the space angle α2 is 37.5°, and the space angle α3 is 67.5°.

Figure 8:
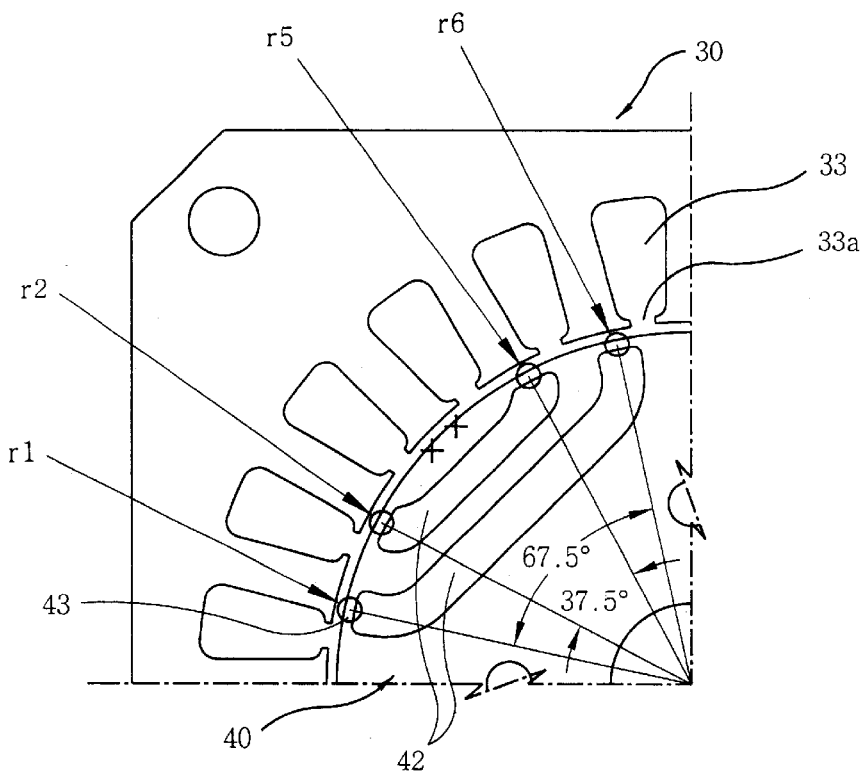
FIGS. 8 and 9 illustrate an instant position of a rotor when the motor is rotated in accordance with the present invention.
Figure 9:
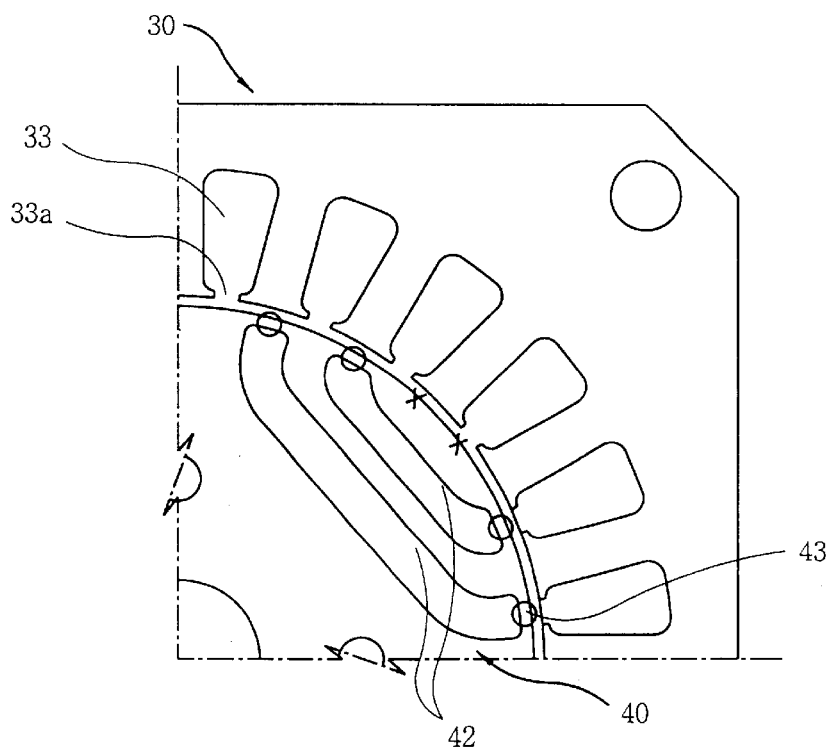

FIGS. 8 and 9 illustrates instant positions of the rotor when the motor is rotated, of which FIG. 8 illustrates a state where the positions of the flux barrier is are balanced on the Q axis, and FIG. 9 illustrates a state where the ribs r1 and r2 at one side of the flux barrier are facing the center of the slot, the ribs r5 and r6 at the other side of the flux barrier are facing the center of the teeth.

By this design, when the rotor is rotated, one rib out of two ribs comprising the two ends of the flux barrier is facing the center of the stator slot, and the other rib is facing the center of the tooth of the stator.

Figure 10:
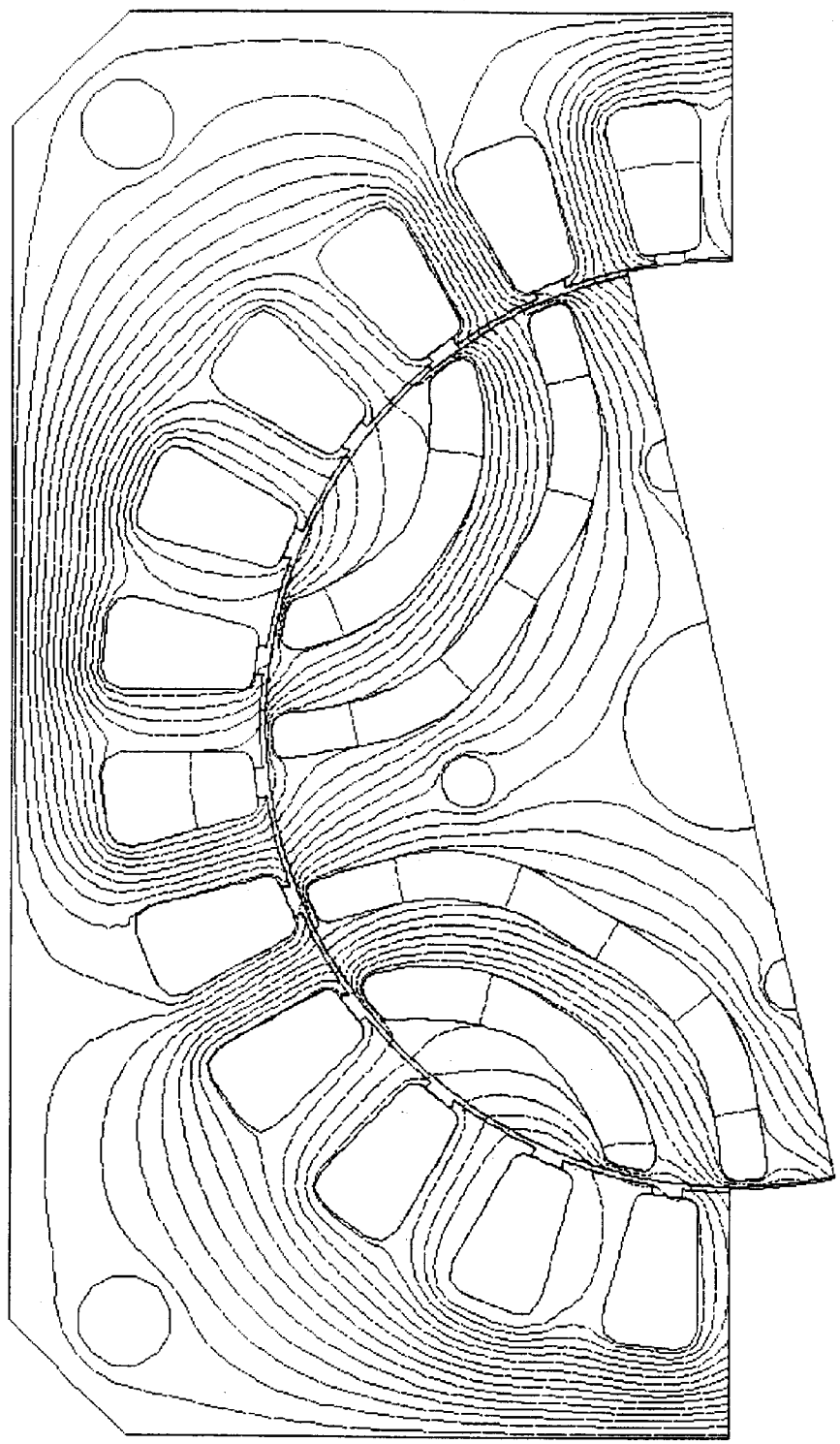
FIG. 10 illustrates a magnetic flux pattern according to a numerical analysis for the structure of FIG. 9 in accordance with the present invention.

FIG. 10 shows a flux pattern according to the numerical analysis for the structure of FIG. 9. As shown in the drawing, the overall average value of the magnetic reluctance is low.

As described above, in a synchronous reluctance motor according to the present invention, while the rotor is being rotated, the average of the magnetic reluctance becomes constant regardless of the positions of the rotor, and thereby the torque ripple is reduced, resulting in a stably driven motor. Since the structure of the rotor is simple, it is easy to fabricate, and thus, the production cost can be reduced.

As the present invention may be embodied in several forms without departing from the spirit or essential characteristics thereof. It should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalents of such meets and bounds are therefore intended to be embraced by the appended claims.

What is claimed is:

1. A flux barrier type synchronous reluctance motor having a stator with a plurality of spaced slots and teeth and a rotor with a plurality of flux barriers, each of the flux barriers having a first rib and a second rib at opposite ends thereof, wherein the first rib faces the center of a respective slot of the stator and the second rib faces the center of a corresponding tooth of the stator, reducing torque ripple, the positions of the flux barrier corresponding to the positions of the stator slots and being determined by the equation:

$$\alpha_m = (2m-1)\theta - \theta/2, m \le Ns/2P \tag{3},$$

where $\alpha_m$ indicates an angle between the ribs and a central axis of a magnetic pole of the motor, θ indicates a pole pitch of a stator slot, and m indicates the order of the ribs distanced from the central axis of the magnetic pole as per pole.

2. The motor according to claim 1, wherein the flux barrier of the rotor is slanted toward the central axis in order not to make a 1:1 matching with the center of the slots.

* * * * *